United States Patent
Lamorlette

[15] 3,659,187
[45] Apr. 25, 1972

[54] SYSTEM FOR SUPPLYING ELECTRIC ENERGY TO AN ELECTRIC TRACTION RAILWAY VEHICLE

[72] Inventor: Paul Lamorlette, Paris, France
[73] Assignee: L'Eclairage Des Vehicules sur Rail (E.V.R.), Paris, France
[22] Filed: Mar. 25, 1970
[21] Appl. No.: 22,469

[30] Foreign Application Priority Data
Mar. 28, 1969 France ..................................6909473

[52] U.S. Cl. ..............................322/26, 318/313, 318/345, 322/39
[51] Int. Cl. ........................................................H02p 9/00
[58] Field of Search ................322/16, 26, 39; 318/313, 326, 318/327, 347, 345, 506, 507, 512; 290/14, 45

[56] References Cited

UNITED STATES PATENTS

| 3,226,626 | 12/1965 | Moore | 322/16 |
| 3,414,790 | 12/1968 | Auld | 318/313 |
| 3,428,881 | 2/1969 | Cote | 318/507 X |

Primary Examiner—Lewis H. Myers
Assistant Examiner—H. Huberfield
Attorney—Sughrue, Rothwell, Mion, Zinn & Macpeak

[57] ABSTRACT

In an electric energy supply system for an electrically drawn railway carriage and fed from the medium-voltage supply of the drive locomotive, a current smoothing choke is coupled to a thyristor type inverter supplying a synchronous motor. A low-voltage alternator is driven by the motor and elements sensitive to the angular position of the rotor of the alternator control the priming of the thyristors of the inverter.

6 Claims, 1 Drawing Figure

Patented April 25, 1972
3,659,187
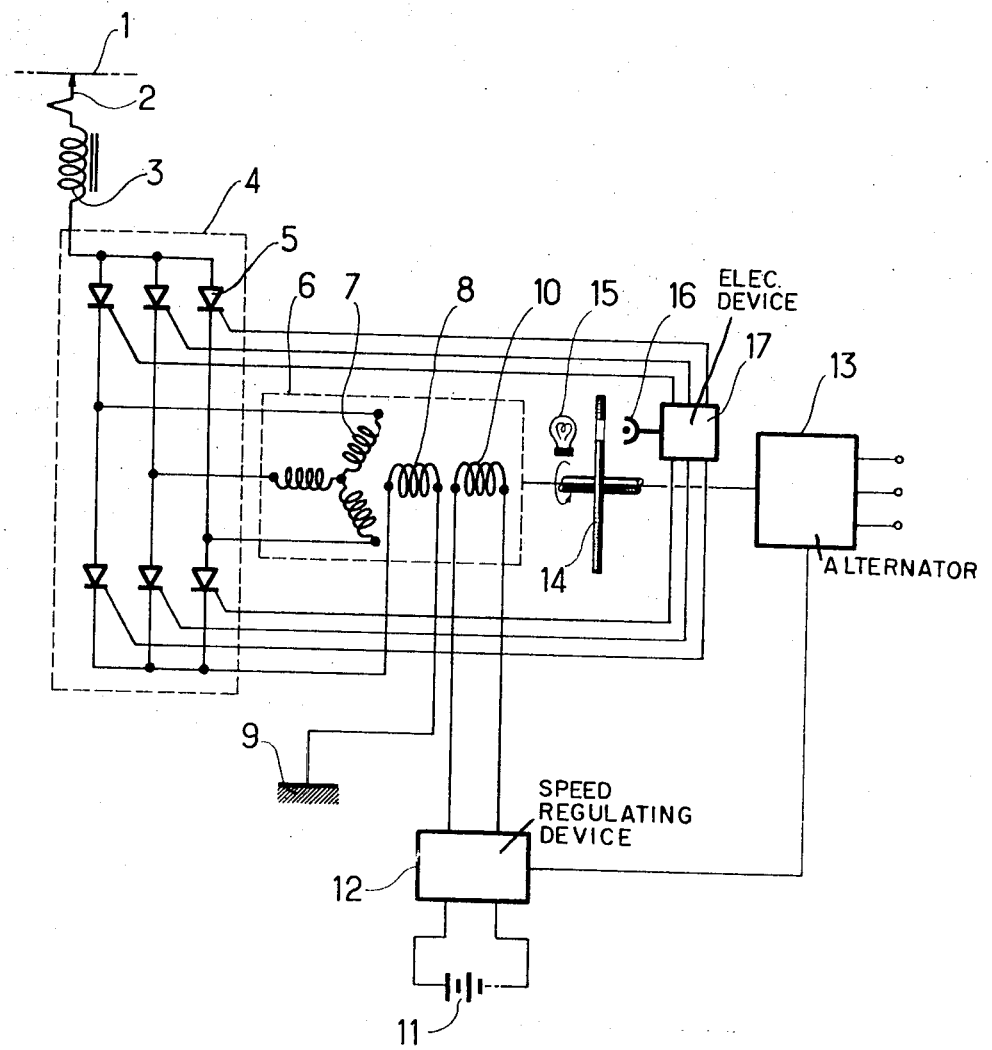
INVENTOR
PAUL LAMORLETTE
BY Sughrue, Rothwell, Mion,
Zinn & Macpeak
ATTORNEY

SYSTEM FOR SUPPLYING ELECTRIC ENERGY TO AN ELECTRIC TRACTION RAILWAY VEHICLE

BACKGROUND OF THE INVENTION

1. Field of the Invention

The present invention concerns a system for supplying electric energy to an electric traction railway vehicle from the medium-voltage supply system of the traction locomotive with the said energy optionally being rectified if it is alternating-current energy.

2. Description of the Prior Art

Hitherto, the lighting and certain associated functions (notably battery recharging) in railway vehicles has been effected by means of generators driven by the axles of the bogies of these vehicles. The generators patented and marketed by the applicant under the trade name "Statodyne" have proved particularly reliable when employed for this purpose. However, such generators cannot at the same time meet the multiple requirements for low-voltage electric energy of de luxe vehicles (heating, driving of door-closing motors, cooling sets for air conditioning, etc.), because they would excessively increase the tractive force.

The electric power necessary for a railway train can be produced by providing in association with the electric locomotive, a car provided with an internal combustion engine which drives a low-voltage generator feeding all the cars of the train. This solution is very costly and is not very rational, because a superabundant quantity of electric energy is made available, i.e. that for the supply of the motors of the traction locomotive. One might envisage utilizing this energy after its voltage has been reduced, but its conversion into low-voltage energy is a very delicate matter, because the medium-voltage current (1,500 or 3,000 volts) for the supply of the motor of the locomotive is either unidirectional or of single-phase alternating form, with a frequency which varies in accordance with the main supply system, and it is generally desirable that the low-voltage alternating current should be of three-phase form. It would therefore be necessary to employ equipment for inverting the direct current, in some cases after rectification of the alternating current. This inverting equipment is very costly and cumbersome, because it has to filter the harmonics of the substantially sinusoidal alternating current of the desired frequency, as also the very high voltage peaks often present in the supply direct current.

SUMMARY OF THE INVENTION

The present invention obviates the aforesaid disadvantages and provides a system of supplying to the cars of an electric traction railway train with substantially sinusoidal low-voltage alternating current with sufficient power to meet all the electric energy requirements of the cars, with the aid of a simple and robust apparatus of low cost and small overall dimensions.

The supply system according to the invention is characterized in that it comprises a current-smoothing inductance, an inverter comprising thyristors which feeds a synchronous motor, a low-voltage alternator driven by the motor, and means sensitive to the angular position of the rotor of the alternator which controls the firing of the thyristors of the inverter.

In addition, the said system preferably has at least one of the following features:

1. The members sensitive to the angular position of the rotor of the alternator consist of light sources disposed on one side of a slotted wheel driven by the shaft common to the synchronous motor and to the alternator, and of photo-diodes or photo-transistors disposed on the other side of the slotted wheel, opposite the light sources.
2. The synchronous motor has, in addition to series excitation, separate excitation controlled by a device for reading the frequency of the current produced by the alternator.
3. The synchronous motor has fixed inductor and armature windings.
4. The low-voltage alternator is a three-phase alternator.
5. When the medium voltage of the rectified supply current is relatively high, the supply is connected in series with at least two windings of the synchronous motor.
6. The current-smoothing inductance is a screened inductance.

The above-defined system has the advantage of supplying a low-voltage current whose voltage and frequency are well-defined and constant, despite the occasional fluctuations of the voltage of the supply circuit. The low-voltage circuit may supply reactive power, which permits notably the use of a lighting circuit comprising fluorescent lamps. The thyristor bridge constitutes a particularly robust member, since the extinction of the thyristors naturally takes place under the effect of the electromotive force which is set up in the windings which are no longer fed when the supply passes to another pair of windings. In addition, the filtering circuits are relatively simple, since the inertia of the motor appreciably compensates for the fluctuations of the supply voltage.

The assembly comprising the thyristor bridge and the synchronous motor is dynamically comparable to a direct-current motor having compound excitation. The thyristors and their electronic controls depend upon the position of the rotor of the motor performing the function of the commutator of the direct-current motor. The starting and the speed regulation of the synchronous motor are effected by the same devices as in the case of a direct-current commutator motor A system for supplying electric energy at 220 volts and 50 c/s to the various electric circuits of a railway vehicle is hereinafter described by way of non-limiting example with reference to the accompanying drawing.

BRIEF DESCRIPTION OF THE DRAWING

The single FIGURE is an electrical schematic diagram of the railway vehicle electrical supply system of the present invention.

DESCRIPTION OF THE PREFERRED EMBODIMENT

In the single FIGURE, the supply circuit 1 of the traction machine (not shown) feeds the latter and the circuits of the vehicles through a pantograph 2. The supply is assumed to be at a unidirectional voltage of 1,500 volts. If it is an alternating-current supply, the system for supplying the vehicle is preceded by a rectifier bridge of known type, which may be placed in and out of circuit by a switch.

The system for supplying the vehicle comprises, in the first place, a current-smoothing inductance 3 intended to reduce the sometimes abrupt fluctuations of the supply voltage. This inductance is preferably provided with an earthed screen, which suppresses the very high stray frequencies, which would otherwise produce flash-overs in the inductance.

Connected in series with the inductance is a thyristor bridge 4 composed of thyristors such as 5 and feeding the three-phase motor 6. The operation of these thyristors is controlled by a mechanism slaved to the angular position of the rotor of the motor, which will hereinafter be described. Although only one thyristor per branch of the bridge has been shown, for the sake of simplicity, it will be appreciated that in practice each of them may comprise a number of series-connected thyristors provided with known means for an accurate distribution of the voltages. These thyristors feed the windings 7 of the armature of the motor 6. The latter has compound excitation, comprising a series excitation 8 connected to ground 9, and an independent excitation 10 fed by the accumulator battery 11 of the vehicle through a speed-regulating device 12 as a function of the frequency of the current of the alternator 13.

The supply thyristors of the motor are controlled by the following arrangement. A wheel 14 formed with slots is disposed between a set of lamps such as 15 and a set of photoconductors such as photo-diodes or photo-transistors 16. When a slot passes between a lamp and a corresponding photo-diode, the electronic device 17 applies a pulse to one of the supply thyristors of the motor. The simultaneous turn-on of two thyristors permits the passage of the current into two of the windings 7 of the armature of the motor and into the series-connected field winding 8.

Although it is possible to use a slip-ring motor, it is preferred, for reasons of robustness and ready maintenance, to use a motor having no slip rings and having fixed field and armatures windings, for example a homopolar motor or a motor of the kind of claw-type alternators employed in electric welding under the trade name Arcodyne, or again a transformer having a rotating primary winding and a fixed secondary winding. If the vehicle may be required to make runs in which the supply circuit of the traction motor is under a unidirectional voltage of 3,000 volts, instead of 1,500 volts, there may be employed a motor having two sets of armature windings, each of which is fed by a thyristor bridge similar to that previously described, the two thyristor bridges being in series. A switch is then provided to place one of the thyristor bridges and the corresponding windings out of service when necessary.

It will be appreciated that various modifications may be made to the system hereinbefore described for the electric supply of a railway vehicle without departing from the scope of the invention. More particularly, the low voltage may be different, for example it may be of 110 volts. The synchronous motor may have a different number of phases. The device for controlling the operation of the thyristors may be any other known device controlled by the angular position of the rotor of the motor.

What is claimed is:

1. In a system for supplying electrical energy to an electric traction railway vehicle from the medium-voltage supply system of a traction locomotive, the improvement comprising a synchronous motor having at least two windings, a current-smoothing inductance connected to said medium-voltage supply system, an inverter comprising thyristors connected to said inductance and feeding said synchronous motor, a low-voltage alternator driven by the motor, means sensitive to the angular position of the rotor of the alternator for controlling the firing of the thyristors of the inverter, and means for insuring that when the mean voltage of the rectified supply current is relatively high, the supply is connected in series with at least two windings of the synchronous motor.

2. The system according to claim 1, wherein the means sensitive to the angular position of the rotor of the alternator comprises light sources disposed on one side of a slotted wheel driven by the shaft common to the synchronous motor and to the alternator, and photo-conductors disposed on the other side of the slotted wheel, opposite the light sources.

3. The system according to claim 1, wherein the synchronous motor has fixed field and armature windings.

4. The system according to claim 1, wherein the low-voltage alternator is a three-phase alternator.

5. The system according to claim 1, wherein the current-smoothing inductance is a screened inductance.

6. In a system for supplying electrical energy to an electric traction railway vehicle from the medium voltage supply system of a traction locomotive, the improvement comprising a synchronous motor including series excitation means and separate excitation means and means for reading the frequency of the current produced by the alternator for controlling said separate excitation means; a current smoothing inductance connected to said medium voltage supply system; an inverter comprising thyristors connected to said inductance and feeding said synchronous motor; a low-voltage alternator driven by the motor; and means sensitive to the angular position of the rotor of the alternator for controlling the firing of the thyristors of the inverter.

* * * * *